Feb. 3, 1959     M. F. PETERS     2,871,870
FLUID PRESSURE SYSTEMS
Filed Aug. 10, 1955
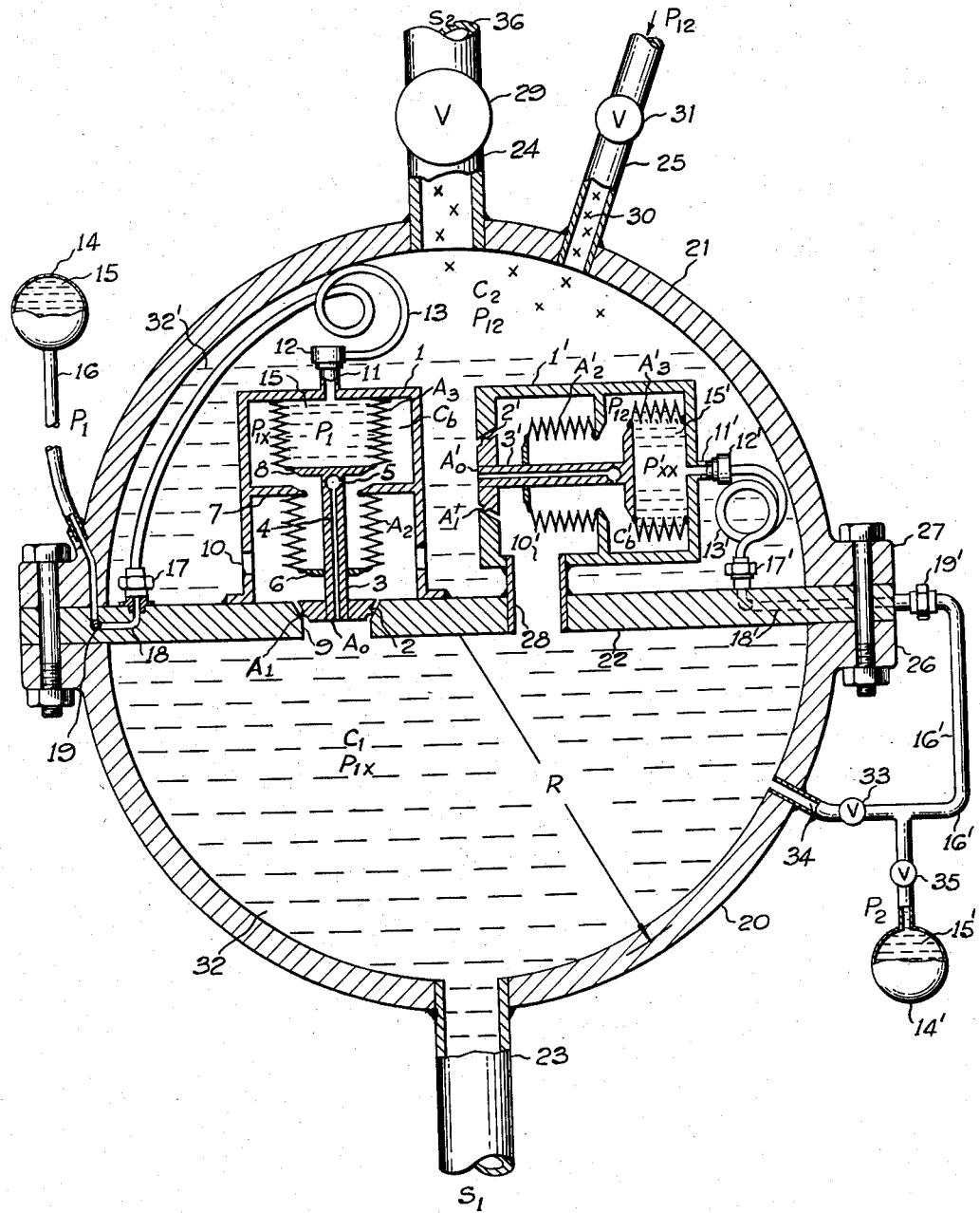
INVENTOR.
Melville F. Peters
BY
Martin J. Finnegan
ATTORNEY

– – –

United States Patent Office 2,871,870
Patented Feb. 3, 1959

2,871,870

FLUID PRESSURE SYSTEMS

Melville F. Peters, Livingston, N. J.

Application August 10, 1955, Serial No. 527,510

4 Claims. (Cl. 137—207)

This invention relates to surge or expansion chambers which are connected to fluid systems to control the pressure when the fluid in the system changes in volume and in particular to chambers which can provide large volume displacements for the fluid in systems while offering high resistance to failure from vibration, shock, roll, changes in temperature, high acceleration and deceleration of the fluids when both the operating pressures and temperatures are high.

The conventional type of expansion or surge chamber consists of a cylindrical shell having hemispherical ends housing a bellows which separates the shell into two compartments by having one end of the bellows joined to the shell and the other end capped with a plate. A conduit connects one compartment to the system and a second conduit connects the other compartment to a source of fluid which supplies a ballast pressure to the bellows, so that when the pressure in the system becomes greater or less than the ballast pressure, the bellows will be compressed or expanded so as to equalize the pressure on the two sides of the bellows. This type of expansion chamber requires a housing strong enough to withstand the pressures developed in the system and for minimum weight will consist of a cylindrical element slightly longer than the extended length of the bellows capped by two dished plates. When the operating pressures are low, the radius of curvature of the dished end plates will be large and both end plates and the cylindrical element can be made of thin material to form a compact and light housing. As the pressures are increased the thickness of the material must be increased throughout and at the same time the radius of curvature of the end plates must be reduced until at very high pressures each end plate will be hemispherical in shape. If with increase in pressure provision must be made for an increase in volume displacement, the size and weight of the chamber may become so great that it cannot be used in many installations requiring an expansion chamber.

To maintain the ballast or control pressure within relatively small values when the bellows is forced to accommodate large volume dispacements, it is necessary to choose between a large ballast chamber which must withstand pressures equal to or greater than the operating pressure of the system, or to use a special control unit to regulate the ballast pressure. In installations which are operated at low pressures and temperatures and are free from vibrations, shock, roll and space is not a limiting factor, the ballast chamber can be used to advantage, since it has no moving parts. When the chambers are subjected to dynamic forces together with an increase in pressure and temperature, the ballast chamber becomes so large and heavy that it can be replaced to advantage by a rugged compact pressure control unit.

Regardless of the operating pressure of the system the pressure differential across the bellows must be small enough to allow the use of a low pressure bellows in the chamber, because a high pressure bellows with a volume displacement of a cubic foot or more operating with a pressure differential of 2000 or 3000 p. s. i., would be so large and heavy, that its use in expansion chambers would be limited to stationary equipment. Moreover, there is always a high probability that the pressure in the system or the ballast pressure will fail and subject the low pressure bellows to a high pressure which will lead to failure of the bellows unless supporting elements are incorporated into the bellows assembly. In general, the supporting structure is simplified by assuming that the ballast pressure will always be maintained and the bellows assembly installed so that if the pressure in the system fails, the bellows plates will nest and prevent the damaging or destruction of the bellows.

An expansion chamber which has a much greater ratio between displacement and weight than the conventional type of chamber and in addition is more resistant to vibration, shock and roll, can be obtained by placing two or more valves in a spherical housing and using a fluid under pressure which will be called the ballast pressure, or a pump, to control the flow of fluid from the housing to the system. A simple type of construction consists of securing two valves to a wall which divides the housing into two compartments. Conduits are used to connect one of the compartments which will be designated the first compartment to the system and the other compartment which is designated the second compartment to a pressure regulating device. When the fluids in the system exceeds the safe operating pressure, one of the valves on the wall will open and allow fluid to flow from the first compartment which is in fluid contact with the system to the second compartment and conversely, when the pressure in the system falls below the lower limit of the operating pressure range, the other valve will open and by means of a ballast pressure force fluid from the second compartment back into the first compartment. For best results, each valve should be controlled by a separate pressure unit and the control pressure required to open and close the valve must remain independent of the forces developed by the other fluids contacting the valve assembly. It is therefore the first object of the invention to mount two valves upon a wall which divides a housing or chamber into two compartments and to allow fluid to flow from the first compartment which is in fluid contact with the system to the second compartment, when the fluid pressure in the system exceeds a predetermined value and by controlling the pressure of the ballast gases in the second compartment, force the fluids from the second compartment to the first compartment when the pressure in the first compartment falls below a designated value. It is a second object of the invention to use valves in the expansion chamber which are responsive to the control pressure and which remain independent of all the forces developed by other fluid pressures acting on the valve assembly. It is a third object of the invention to control the mixing of fluids by connecting each compartment in the expansion chamber to a system containing a fluid and controlling the flow of fluid from one compartment to one or more other compartments by one or more valves which are regulated by a fluid pressure supplied to the control bellows of each valve.

When the expansion chamber can be placed near the system the lower compartment can be eliminated and the plate bolted or secured to a part of the system. It is therefore a fourth object of the invention to control the flow of fluid between a system and an expansion chamber by placing the system on one side of the valves and the expansion chamber on the other side of the valves, so that the chamber has but one compartment.

Since the valve operates independently of the ambient pressure, it is possible to have one or more valves open at the critical pressure in a low pressure system and allow an inflammable fluid to enter the system so as to reduce the probability of a fire or an explosion. It is therefore the fifth object of the invention to mount a plurality of valves on partitions separating two or more chambers and when the pressure or temperature in one chamber exceeds a predetermined value, one or more valves will open and allow fluids to pass into the chamber which has developed a dangerous pressure or temperature.

Since the pressure in the housing of the chamber is equal to the vapor pressure of the fluid at the operating temperature of the housing and is independent of the pressure in the system, the pressure developed in the housing is generally negligible and consequently the thickness of the housing can be reduced since its only purpose is to support the valve and a portion of the pump assembly together with the fluid which flows from the system. When the valve assembly fails, however, the expansion chamber will be exposed to the pressure in the system and consequently regardless of the safety features built into the valve assemblies, many types of installations will demand a housing which can withstand the operating pressure of the system.

When the critical pressure in a system is fixed, it is possible to substitute a spring in the control bellows for the control pressure and have the valve operate at the critical pressure in the system and remain unaffected by the fluid pressures contacting the valve assembly. It is therefore a sixth object of the invention to make an expansion or surge chamber assembly which initiates the flow of fluid from the system into the housing of the assembly when the pressure exceeds a predetermined value and to stop the flow of fluid through the valve when the pressure in the system drops to a predetermined pressure by using a valve controlled by a spring in the bellows assembly. It is a seventh object of the invention to make an expansion chamber which operates at a critical pressure in a system and is independent of the pressure in the expansion chamber.

The drawing is an expansion or surge chamber consisting of two elements separated and bolted to a plate to form two compartments with two valves which are not affected by ambient pressures mounted on the plate, a control unit for each valve, a source of fluid which can force other fluids from one compartment to the other compartment, together with conduits and fittings to connect the conduits to the system and control pressure equipment, an embodiment of the invention.

In the drawing, the housing of the expansion chamber consists of two parts, 20 and 21, separated by wall 22 and the complete assembly is held together by bolting the plate 22 and the two flanges 26 and 27 with a plurality of bolts. When the unit is used as an expansion chamber for a system $S_1$ connected to conduit 23, the valve 29 on conduit 24, is closed. The conduit 25 is connected to a pressure regulating device which controls the pressure $P_{12}$ of the ballast gases 30 when the valve 31 is open. When the pressures in the system $P_{12}$ and in the regulating device $P_{1x}$ are low, the shape and thickness of the parts 20, 21 and the plate 22 are not important. As the pressures $P_{12}$ and $P_{1x}$ are increased, the parts 20 and 21 should be dished to save material and as the pressures are further increased the radius of curvature R of 20, 21 should be reduced until each part is a hemisphere. The two valves 1 and 1' are alike and their action is fully described in the patent application of Melville F. Peters, the applicant in this application, Serial Number 523,011, filed July 19, 1955, and the parts of 1' similar to 1 are marked with a prime such as 2 and 2', or 3 and 3'. The effective or piston area of the disk $A_1$ is equal to the effective area of bellows $A_2$, which is fastened at one end to the wall 7 and at the other end to the shoulder 6 which is attached to the valve stem 3, as indicated here and throughout by the heavy dots which appear at some portion of the contacting surfaces. A hole 4 through the center of the disk $A_1$ and the valve stem 3, allows fluid from chamber $C_1$ to pass through the disk, stem and hole 5 into chamber $C_b$, so that the pressure surrounding bellows $A_3$ which has one end fastened to shoulder 8 of the valve stem and the other end to 1, will be the same as the pressure in chamber $C_1$. The vent 9 allows the fluid in $C_1$ to contact disk $A_1$ and vent 10 permits fluid to flow through the valve when $A_1$ is raised. The conduit 28 supports and allows fluid to $C_2$ to contact disk $A'_1$ and vent 10' permits fluid to flow through the valve when $A'_1$ is raised. The pressure $P_1$ in bellows $A_3$ is controlled by the pressure of fluid 15 in the control unit 14, which is in fluid contact with $A_3$ through the conduits and fittings 11, 12, 13, 17, 18, 19, 16 and in like manner the pressure $P'_{xx}$ in bellows $A'_3$ is controlled by the pressure of 15' in control unit 14' which is in fluid contact with $A'_3$ through the conduits and fittings 11', 12', 13', 17', 18', 19', 16', 35, when valve 33 is closed and valve 35 is open. The conduits 18, 18' are ducts in plate 22 and this construction has the advantage that the control unit can be assembled and tested before the top section is put in place. The fittings 19, 19' are secured to 22 so that conduits 16, 16' can be joined to the ducts 18, 18' without disturbing the assembly.

When the chamber is used to seal the system $S_1$ over one range of pressures and to act as an expansion chamber over another range of pressures, where these ranges are synchronized with changes in the system $S_1$, valve 33 is closed and valve 35 opened.

When the chamber is to be used to control the flow of fluid between the system connected to conduit 23 and conduit 36, valves 31 and 33 are closed and valves 29 and 35 are opened. As long as $P_{1x}<P_1$ valve 1 will remain closed and in like manner as long as $P_{12}<P'_{xx}$, valve 1' will remain closed. If the pressure in $P_{1x}$ should exceed the safe operating value $P_1$, valve 1 will open and if $P_{1x}>P_{12}$ fluid will flow from $C_1$ to $C_2$, but if $P_{1x}<P_{12}$ the fluid will flow from $C_2$ to $C_1$. Suppose $P_{1x}$ is dangerously high at 200 p. s. i. and the fluid in $C_2$ is compressed carbon dioxide at 800 p. s. i. Then when valve 1 opens $CO_2$ will flow from $C_2$ to $C_1$ and eliminate the possibility of an explosion or a fire in $C_1$. In the same manner, the fluid in the system connecting conduit 36 can be protected. By using pressure controlled tanks 14, 14', a mixing pattern between the two systems $S_1$ and $S_2$ can be followed.

When the device is to be used to control the pressure $P_{1x}$ in chamber $C_1$, the valves 29 and 35 are closed, and the valves 31 and 33 are opened. In this way when $P_{1x}<P_{12}$ the valve 1' will open allowing flow from chamber $C_2$ to chamber $C_1$ since the pressure in $15^1$ will be the pressure $P_{1x}$.

When the fluids 32 and 32' dissolve enough of the gases 30 to interfere with processes taking place in the system, a pump must be used to return the fluids from the expansion chamber to the system when the pressure in the system becomes less than the predetermined value.

What I claim is:

1. A surge chamber structure for a fluid pressure system comprising, a chamber, a partition dividing the chamber into two parts, one part of said chamber being in communication with the fluid system, fluid responsive valve means carried by the partition within said chamber, a housing around each valve, a bellows member sealed at one end to the top of each valve and at its other end to the inside of the housing, an auxiliary balancing fluid pressure system connected to the bellows on each valve, a source of ballast gas in communication with the chamber and means associated with said valves and including the ballast gas for operating the valves to allow fluid to pass from the system into the chamber upon increase of the fluid pressure in the system and to allow the said fluid to leave the chamber upon decrease of the said fluid pressure.

2. A surge chamber structure for a fluid pressure system comprising, a chamber, a partition dividing the chamber into two parts, one part of said chamber being in communication with the fluid system, fluid responsive valve means carried by the partition within said chamber, a housing around each valve, a bellows member sealed at one end to the top of each valve and at its other end to the inside of the housing, an auxiliary balancing fluid pressure system connected to the bellows on each valve, a source of ballast gas in communication with the upper part of the chamber and means associated with said valves and including the ballast gas for operating the valves to allow fluid to pass from the system into the chamber upon increase of the fluid pressure in the system and to allow the said fluid to leave the chamber upon decrease of the said fluid pressure.

3. A surge chamber structure for a fluid pressure systems comprising, a chamber, said chamber being in communication with the fluid system, fluid responsive valve means including at least two bellows a valve member secured to each of said bellows supported by the chamber walls and extending within said chamber, an auxiliary balancing fluid pressure system connected to each valve bellows, a source of ballast gas in communication with the chamber and means connected to the bellows on said valves, and including the ballast gas for operating the valves to allow fluid to pass from the system into the chamber upon increase of the fluid pressure in the system and to allow the said fluid to leave the chamber upon decrease of the said fluid pressure.

4. A surge chamber structure for a fluid pressure system comprising, a chamber, a partition dividing the chamber into two parts, one part of said chamber being in communication with the fluid system, fluid responsive valve means including at least two bellows and a valve member secured to each of said bellows carried by the partition within said chamber, an auxiliary balancing fluid pressure system connected to each valve bellows, a source of ballast gas in communication with the chamber and means connected to the bellows on said valves and including the ballast gas for operating the valves to allow fluid to pass from the system into the chamber upon increase of the fluid pressure in the system and to allow the said fluid to leave the chamber upon decrease of the said fluid pressure.

References Cited in the file of this patent

UNITED STATES PATENTS 2,700,488    Rafferty ---------------- Jan. 25, 1955